(12) United States Patent
Dang et al.

(10) Patent No.: US 12,482,311 B2
(45) Date of Patent: Nov. 25, 2025

(54) ACCIDENT-DATA-BASED VEHICLE FEATURE DETERMINATION

(71) Applicant: Capital One Services, LLC, McLean, VA (US)

(72) Inventors: Steven Dang, McLean, VA (US); Chih-Hsiang Chow, McLean, VA (US); Elizabeth Furlan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1314 days.

(21) Appl. No.: 17/181,572

(22) Filed: Feb. 22, 2021

(65) Prior Publication Data

US 2021/0171021 A1 Jun. 10, 2021

Related U.S. Application Data

(63) Continuation of application No. 16/896,925, filed on Jun. 9, 2020, now Pat. No. 10,926,758, which is a
(Continued)

(51) Int. Cl.
*G07C 5/08* (2006.01)
*B60W 30/08* (2012.01)
(Continued)

(52) U.S. Cl.
CPC .......... *G07C 5/0841* (2013.01); *B60W 30/08* (2013.01); *G06F 18/23* (2023.01); *G06N 3/08* (2013.01); *G06N 20/00* (2019.01); *G06V 20/13* (2022.01)

(58) Field of Classification Search
CPC ........ G07C 5/0841; G06N 3/08; G06N 20/00; G06F 18/23; B60W 30/08
See application file for complete search history.

(56) References Cited

U.S. PATENT DOCUMENTS 11,661,072 B1\* 5/2023 Cardona .................. G06N 3/09
701/29.3

OTHER PUBLICATIONS

Kuehn, M., Hummel, T., & Bende, J. (Jun. 2009). Benefit Estimation of Advanced Driver Assistance Systems for Cars Derived. In Proceedings of the 21st International Technical Conference on the Enhanced Safety of Vehicles (EVS), Stuttgart, Germany (pp. 15-18). (Year: 2009).\*

(Continued)

*Primary Examiner* — Benjamin P Geib
(74) *Attorney, Agent, or Firm* — Foley & Lardner LLP

(57) ABSTRACT

Accident location data and present vehicle feature data may be obtained, wherein the accident location data indicates one or more locations associated with one or more vehicular accidents, and the present vehicle feature data indicates one or more sets of vehicle features. A set of prediction model parameters of a prediction model may be configured based on the accident location data and the present vehicle feature data for prediction of damage-reduction-related values associated with a set of available vehicle features. The prediction model may be used to determine one or more damage-reduction-related values based on first vehicle data indicating a first vehicle, a set of vehicle features available to the first vehicle, and a first geospatial location. A first set of features for the first vehicle may be generated based on the damage-reduction-related values.

20 Claims, 4 Drawing Sheets

Related U.S. Application Data continuation of application No. 16/654,214, filed on Oct. 16, 2019, now Pat. No. 10,710,578.

(51) Int. Cl.
| | | |
|---|---|---|
| *G06F 18/23* | (2023.01) | |
| *G06N 3/08* | (2023.01) | |
| *G06N 20/00* | (2019.01) | |
| *G06V 20/13* | (2022.01) | |

(56) References Cited

OTHER PUBLICATIONS

Kreiss, J. P., Schüler, L., & Langwieder, K. (Jun. 2005). The effectiveness of primary safety features in passenger cars in Germany. In Proceedings of the 19th ESV Conference, paper (No. 05-0145). (Year: 2005).*

* cited by examiner

ACCIDENT-DATA-BASED VEHICLE FEATURE DETERMINATION

CROSS-REFERENCE TO RELATED APPLICATION(S)

This application is a continuation of U.S. patent application Ser. No. 16/896,925, filed Jun. 9, 2020, which is a continuation of U.S. patent application Ser. No. 16/654,214, filed Oct. 16, 2019, which is incorporated herein in its entirety be reference.

FIELD OF THE INVENTION

The invention relates to vehicle feature determination, for example, including accident-data-based vehicle feature determination, configuration of a neural network or other model to predict vehicle features for a vehicle, etc.

BACKGROUND OF THE INVENTION

Advances in vehicle manufacturing have increased the number of vehicle features that can be installed on vehicles. However, due to the sheer number of possible vehicle features available for installation and the multitude of vehicle models available for manufacture, vehicle customization becomes less an issue of what vehicle features are possible for installation and more an issue of what vehicle features are effective for installation. In such scenarios, vehicle features that do not contribute to vehicle safety may be installed on a vehicle and vehicle features that do contribute to vehicle safety of a vehicle may be overlooked. These and other drawbacks exist.

SUMMARY OF THE INVENTION

Aspects of the invention relate to methods, apparatuses, media, and/or systems for facilitating accident-data-based configuration of a prediction model to predict vehicle features for a vehicle.

In some embodiments, accident location data, accident damage data, and present vehicle feature may be obtained. The location data may indicate one or more locations associated with one or more vehicular accidents. The accident damage data may indicate damage resulting from the vehicular accidents and the present feature data may indicate one or more sets of vehicle features present on one or more vehicles involved in the vehicular accidents. A prediction model may be configured based on the accident location data, the accident damage data, and the present vehicle feature data to configure parameters of the prediction model for prediction of damage-reduction-related values associated with the set of available vehicle features for a vehicle in a geospatial region. Data may be obtained for a first vehicle that includes an identifier of the first vehicle, a set of vehicle features available to be installed the first vehicle, and a first geospatial region. The prediction model may be used to determine one or more damage-reduction-related values for the first vehicle based on the first vehicle data. A first set of vehicle features for the first vehicle may be generated based on the damage-reduction-related values.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION OF THE INVENTION

In the following description, for the purposes of explanation, numerous specific details are set forth in order to provide a thorough understanding of the embodiments of the invention. It will be appreciated by those having skill in the art, however, that the embodiments of the invention may be practiced without these specific details or with an equivalent arrangement. In other cases, well-known structures and devices are shown in block diagram form in order to avoid unnecessarily obscuring the embodiments of the invention.

Figure 1:
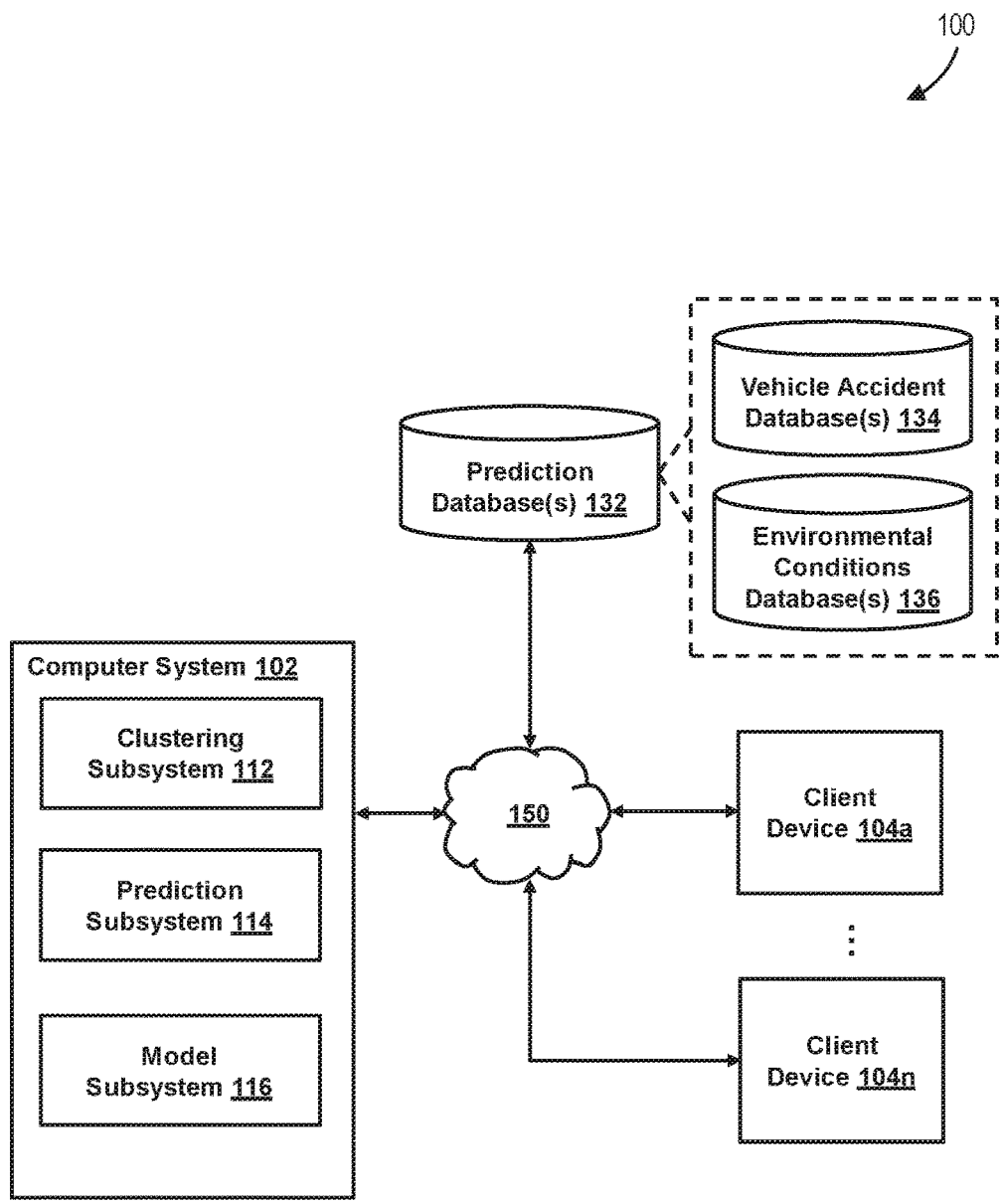
FIG. 1 show a system for facilitating vehicle feature determination, in accordance with one or more embodiments.

FIG. 1 show a system 100 for facilitating vehicle feature determination, in accordance with one or more embodiments. As shown in FIG. 1, system 100 may include computer system 102, client device 104 (or client devices 104a-104n), or other components. Computer system 102 may include a clustering subsystem 112, a prediction subsystem 114, a model subsystem 116, and/or other components. Each client device 104 may include any type of mobile terminal, fixed terminal, or other device. By way of example, the client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may facilitate the determination of damage-reduction-related values based on one or more vehicular accident datasets and use these values to select which of a set of vehicle features to install in a vehicle to increase vehicle safety and efficiency. Used herein, a damage-reduction-related value may be any value associated with damage resulting from a vehicular accident.

Examples of damage-reduction-related values may include injuries, fatalities, significance of damage (e.g., whether a vehicle is rendered inoperable), probabilities for the occurrence of any of the above, medical expenses, monetary damages, and the like. In some embodiments, the vehicular accident dataset may include the location of an accident and details about the accident, such as the vehicles involved in the accident, damage values resulting by the accident, and the features installed on the cars involved in the accident. As an example, a vehicular accident dataset may include an accident location for a vehicle accident, images of the vehicle accident, identifiers of one or more vehicles involved in the vehicle accident, and/or features installed on the vehicles involved in the accident. In some embodiments, the system 100 may also include environmental conditions data that includes information corresponding to the weather at the time of an accident. As an example, weather data may include a weather type, a weather severity, and/or other weather information. In some embodiments, system 100 may facilitate the determination of damage-reduction-related values based on one or more vehicular accident datasets and use these values to select one or more vehicles or vehicle features to facilitate vehicle safety and efficiency. In some embodiments, the values may be used to select which of a set of vehicle features to install in a vehicle to increase vehicle safety and efficiency (e.g., by providing such vehicle features as parameters in an autonomous vehicle production or vehicle feature installation environment or to other made-to-order or customization systems).

A dataset may include data associated with one or more different feature types. For example, a dataset may include accident-associated data, such as the number of vehicles involved in an accident, the model of the vehicles involved the accident, a set of vehicle features available to each of the vehicle models involved in the accident, and the like. In one use case, the dataset may include a number of vehicular accident records, where each vehicular accident record includes a date and time for its respective accident, a location at which the accident occurred, vehicle identification numbers (VIN) corresponding to each of the vehicles involved in the accident, and images of the accident aftermath. The collection of the vehicular accident records may encompass some or all of a dataset, and the information may encompass some or all of the data including various feature types.

In some embodiments, the feature types represented by a dataset may be heterogeneous to a particular field such that the dataset may be used to train a particular type of prediction model. As an example, a dataset may include data associated with vehicular accidents, such as vehicle types, vehicle features, weather type(s) at the time and location of accidents, and injuries/deaths resulting from an accident. Clustering, neural network training, or other techniques may be applied to this dataset and/or other datasets to predict damage-reduction-related values associated with a feature. In addition, the set of damage-reduction-related values may be used to determine which set of available features for a vehicle will provide enhanced vehicle safety/performance with consideration to a particular geospatial region in which the vehicle is expected to be used over the course of the expected vehicle lifespan obtained for the input vehicle.

In some embodiments, an input expected vehicle lifespan may be a preset value (e.g., set to be 8 years by default). Alternatively, the input expected vehicle lifespan may be obtained by performing a calculation based on a known history of vehicles sharing a same vehicle type as the first vehicle. Example vehicle type may include various automotive vehicle classes such as "minicompact," "subcompact," "compact," "mid-size," "large," "sport utility vehicle (SUV)," "Van," "Minivan," "Truck," "sedan," "coupe," "hatchback," "convertible," "wagon," and the like. A vehicle type may also include various classes corresponding to types of other vehicles. For example, input vehicle types may include types of two-wheeled vehicles such as "scooter," "motorcycle," "bicycle," and the like. For example, if an input vehicle has a model of "Model1234" and has a manufacturing year of 2019, the input expected vehicle lifespan may be a measurement of centralized tendency (e.g., mean, mode, median) of the same model manufactured over the previous 15 years. In some embodiments, the input expected vehicle lifespan may be obtained by performing a calculation based on a measurement of centralized tendency (e.g., mean, mode, median) of a history of the ownership periods of vehicles previously owned/used by a user. For example, a database storing a user profile containing a user ownership history may be accessed analyzed and a determination may be made that the user owns a vehicle for an average of 6 years before replacing an older vehicle with a newer vehicle.

The damage-reduction-related values may be represented by a set of homogeneous or heterogeneous values. In some embodiments, the damage-reduction-related values may include one or more accident probabilities, where the accident probability may be a ratio representing a probability of accidents over the course of an expected vehicle lifespan. For example, a cost reduction score may be represented by the numeric value 0.15, suggesting that the cost reduction score represents a 15% rate over an expected vehicle lifespan. In addition, the damage-reduction-related values may be weighted by a damage value associated with each of a set of accidents. For example, each accident in a dataset for a particular vehicle may be categorized into two subsets based on possessing a vehicle feature or not possessing a vehicle feature, where the first subset include vehicles possessing the vehicle feature and the second subset of accidents include vehicles that do not possess the vehicle feature. A sum of the accident records weighted by their associated accident damage in each subset may be calculated and used to determine damage-reduction-related cost values. For example, a first subset may have a damage-reduction-related cost value of 0.15 fatalities over an eight-year period and a second subset may have a damage-reduction-related value of 0.2 fatalities over an eight-year period. In some embodiments, a target damage-reduction-related value may be selected from a set of damage-reduction-related value based on one or more criteria depending on the type of damage-reduction-related value. For example, some embodiments may select for the lowest number of injuries or fatalities, the greatest monetary reduction in damage, and/or the fewest number of accidents.

In some embodiments, different input locations may result in different outputs of a given prediction model in different ways. Weather patterns, road conditions, wildlife prevalence, local traffic trends, and/or other region-dependent factors may change which set of vehicle features may reduce accidents and/or accident-based damages for a vehicle in an associated geospatial region. Expected weather types and/or other environmental factors in a geospatial region associated with an input vehicle may, in some embodiments, be utilized to more accurately predict the anticipated conditions and accident damage associated with the input vehicle. For example, a prediction model having input locations associated with snowy weather types may have decreased fatalities for cars having heated mirrors in comparison to cars without heated mirrors, whereas it is possible that no difference in fatalities may be determined for input locations associated with non-snowy weather types. As another example, a prediction model having input locations associated with high weather severity values may have decreased fatalities for cars having anti-fog windshields in comparison to cars without anti-fog windshields, whereas it is possible that no difference in fatalities may be determined with respect to anti-fog windshields for input locations associated with light weather severity values.

In some embodiments, the prediction model may include a clustering model to determine which of a set of data features to use for generating damage-reduction-related values. For example, the prediction model may include a clustering model, where the clustering model is generated by implementing a clustering algorithm on a dataset that includes a set of accident records. The clustering model may include a set clusters of accident records, where each of the set of clusters is associated with different weather types, one or more vehicle features, and/or other feature types. The clustering model may be configured by changing clustering parameters, changing the records associated with each of the clusters, changing the number of clusters, and/or otherwise changing the composition of the clusters in a clustering model.

In some embodiments, the prediction model may include a clustering model to determine which of a set of data features to use for generating damage-reduction-related values. For example, the prediction model may include a clustering model, where the clustering model is generated by implementing a clustering algorithm on a dataset that includes a set of accident records. The clustering model may include a set of clusters of accident records, where each of the set of clusters are associated with different weather types, vehicle features, and/or other data features. The clustering model may be configured by changing clustering parameters, changing the records associated with each of the clusters, or otherwise changing the number or composition of the clusters in a clustering model.

In some embodiments, the prediction model may include a supervised learning model such as a neural network to predict damage-reduction values. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and may perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, where neuron connections may interact in complex relationships.

In some embodiments, the parameters (e.g., weights, biases, neural network hyperparameters, etc.) of the neural network may be configured by way of training the neural network based on a training dataset that includes values from a vehicular accident dataset(s) and/or environmental conditions dataset(s). For example, a training dataset may include weather conditions, accident locations, vehicle model identifiers, indicator representing whether the particular vehicle feature is present, and accident damage values may be used to train a neural network of the prediction model to determine a set of damage-reduction-related values. In some embodiments, the objective function of the aforementioned training operation includes determining a difference between the known accident costs and predicted accident costs, where a trained neural network may predict a damage value based on a weather condition, location, vehicle model identifier, and indicator representing whether the particular vehicle feature is present.

After determination of a set of damage-reduction-related values for an input vehicle for an associated geospatial region, a configured prediction model may determine whether any available vehicle features on a vehicle meet one or more installation criteria based on the set of damage-reduction-related values. For example, the installation criteria may include a criterion that, for a vehicle feature to be installed in a vehicle, the corresponding damage-reduction-related value for that vehicle feature is less than a damage-reduction-related threshold and/or a comparison value difference based on the damage-reduction-related value satisfies an installation threshold. In some embodiments, the prediction model may generate a set of available vehicle features for installation on the input vehicle based on which available vehicle features resulted the greatest reduction of damages during accidents.

Figure 2:
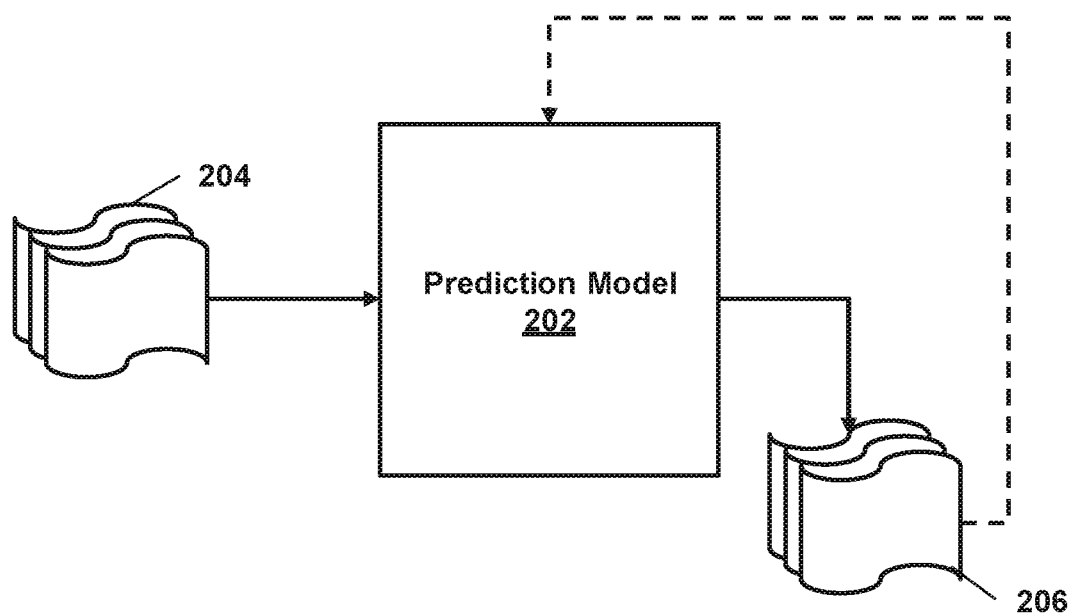
FIG. 2 shows a prediction model trained using training data, in accordance with one or more embodiments.

As an example, with respect to FIG. 2, prediction model 202 may take inputs 204 and provide outputs 206 based on one or more prediction model parameters. In some embodiments, the prediction model 202 may include a clustering model and/or the results of the clustering model. For example, the prediction model 202 may include a clustering model and/or the set of clusters associated with different records in a dataset of vehicle accidents. Alternatively, or in addition, the prediction model 202 may include one or more neural networks and/or other learning models. For example, the prediction model 202 may use a neural network to determine the damage of an accident, number of injuries/fatalities, and other possible outputs.

A prediction model parameter may include one or more values used to provide an output based on an input value, where the number and type of prediction model parameters used may vary based on the prediction model 202. In some embodiments, a prediction model parameter of a clustering model may include the number of accident records associated with a set of clusters, ratios of the number of records associated with clusters, or other results based on a set of clusters. For example, a prediction model parameter may include a ratio of the total number of records associated with a first cluster and the total number of records associated with a second cluster. Alternatively, or in addition, the prediction model parameter of a cluster model may include clustering parameters used to generate a set of clusters, such as a selected distance function, a density threshold, a total number of clusters. In some embodiments, iterative and self-learning methods may be applied to refine the clustering parameters to generate modified clusters and/or additional clusters.

In some embodiments, outputs 206 may be fed back to the prediction model 202 as an input to train components of the prediction model 202 (e.g., alone or in conjunction with user indications of the accuracy of outputs 206, labels associated with the inputs, or with other reference feedback information). In some embodiments, the prediction model 202 may include a neural network, where the prediction model 202 may update its prediction model parameters for the neural network (e.g., weights, biases, activating function, hyperparameters) based on its assessment of its prediction (e.g., outputs 206) and reference feedback information (e.g., user indication of accuracy, reference labels, or other information). In some embodiments, connection weights may be adjusted to reconcile differences between the neural network's prediction and the reference feedback. Some embodiments include one or more neurons (or nodes) of the neural network requiring that their respective errors are sent backward through the neural network to them to facilitate the update process (e.g., backpropagation of error). Updates to the connection weights may, for example, be reflective of the magnitude of error propagated backward after a forward pass has been completed. In this way, for example, the prediction model 202 may be trained to generate better predictions of damage-reduction-related values and/or sets of vehicle features corresponding to the damage-reduction-related values. In addition, the neural network may include various types of neural networks, such as convolutional neural networks, recurrent neural networks, long-short-term-memory neural networks, and the like.

In some embodiments, the prediction model 202 may include both one or more clustering models and one or more neural networks. For example, the prediction model 202 may receive input data that includes an indicator for an input vehicle and set of input locations. The prediction model 202 may then use a clustering model generated from the input data to determine the probability of an accident occurring based on the input data and whether one or more vehicle features are installed on the input vehicle. The prediction model 202 may then use a neural network to predict accident damages based on the input data for the scenario in which the set of vehicle features are installed and the for scenario in which the set of vehicle features is not installed.

Subsystems 112-116

In some embodiments, the clustering subsystem 112 and the model subsystem 116 may obtain values from a vehicular accident dataset and an environmental conditions dataset to configure the prediction model parameters of a prediction model. Configuring the prediction model parameters may include configuring clustering system parameters and/or configuring learning system parameters. Once configured, the prediction model (or an instance thereof) may be provided an identifier corresponding to the input vehicle and an input location to recommend or otherwise determine a set of available vehicle features to install on the input vehicle based on the input location. As an example, the set of available vehicle features may include one or more of an automatic emergency braking system, a forward collision indicator, a blind spot alert system, automated high-beam lighting system, auto-dimming mirrors, and the like. In one use case, the computer system 102 may send a message to the client device 104, where the client device 104 displays a set of available vehicle features to a user for confirmation that the set of vehicle features are to be scheduled for installation. Upon receiving confirmation that the set of available vehicle features is to be scheduled for installation on a candidate vehicle, the computer system 102, client device 104, and/or another system may then transmit a message including a representation of the set of available vehicle features to an application being executed by server via an application protocol interface (API) of the application. The application may be in communication with a manufacturing center and direct the manufacturing center to install the set of available vehicle features on the candidate vehicle.

Figure 3:
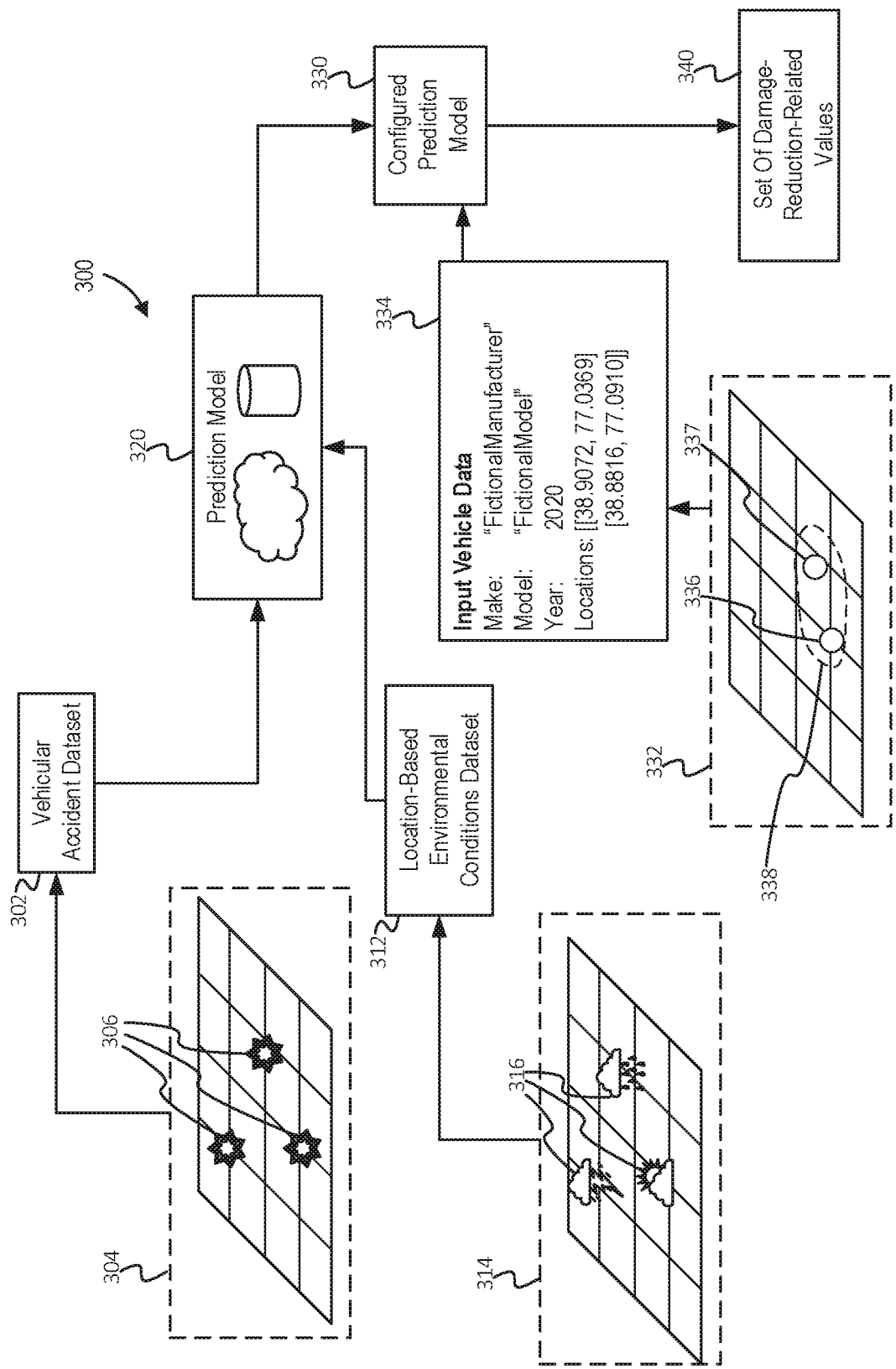
FIG. 3 shows a configuration and utilization of a prediction model to determine a set of damage-reduction-related values, in accordance with one or more embodiments.

In one scenario, with respect to FIG. 3, the computer system 102 may obtain a vehicular accident dataset 302 and a location-based environmental conditions dataset 312. The vehicular accident dataset 302 may include data corresponding to accidents occurring in region 304. In some embodiments, the vehicular accident dataset 302 includes accident location data, where the accident location data may include values such as latitude and longitude coordinates, a street address, a zip code address, and the like. In some embodiments, the vehicular accident dataset 302 may include a time of the accident for one or more of the accidents identified in the vehicular accident dataset 302, where the time may be represented by a date, a time of day, a time range (e.g., 5 PM to 6 PM), a categorical label representing a time period (e.g., "evening"), etc. As an example, the computer system 102 may use a vehicular accident dataset that includes the values "20160101" and "0510" to represent the date "Jan. 1, 2016" and the time 5:10 AM, respectively. Additionally, or alternatively, the vehicular accident data set may include types of accidents (e.g., highway incident, city incident, head-on or other collision types, etc.), types of vehicles in the accidents (e.g., vehicle class, vehicle size, make and model, etc.), or other details.

The location-based environmental conditions dataset 312 may include data corresponding to environmental conditions occurring in region 314, where the region 314 may include at least a portion of the region 304. In some embodiments, the region 314 and 304 may be identical. Alternatively, the region 314 may be larger than the region 304 or smaller than the region 304. Measurements of environmental conditions (e.g., weather type, weather severity, temperature, pressure, humidity, road wetness, etc.) that have occurred over time and localized to locations in the region 314 may be stored in the location-based environmental conditions dataset 312. For example, each of the accident locations of the accidents 306 and their corresponding accident times may have an associated environmental condition such as the weather type values "thunderstorm," "rain," and "partly cloudy," as represented by the weather symbols 316. In some embodiments, the environmental conditions may include categorical values such as a weather type (e.g., thunderstorm, raining, partly sunny, etc.) and/or a weather severity. In addition, or alternatively, the location-based environmental conditions dataset 312 may include quantitative values such as temperature, pressure, humidity, and the like.

The prediction model 320 may include one or more models configured by the clustering subsystem 112 and the model subsystem 116. The prediction model 320 may be used by the prediction subsystem 114 to determine damage-reduction-related values. For example, the prediction model 320 may include a clustering model, where the clustering subsystem 112 may perform one or more clustering operations on a vehicular accident dataset to generate the clustering model. A clustering model may include a plurality of records, where each of the plurality of records is assigned to one of a set of clusters. Each of the set of clusters in the clustering model may include one or more records from the vehicular accident dataset 302 and/or the location-based environmental conditions dataset 312. For example, the records of a dataset used by the clustering subsystem 112 to configure the prediction model 320 may include values from the vehicular accident dataset 302 such as an accident identifier, an accident location, a date and/or time of accident occurrence, one or more vehicle identifiers corresponding to the vehicles involved in the accident, and a set of indicators identifying which features are present in the vehicles involved in the accident, and/or one or more images of an accident aftermath. The dataset used to configure the prediction model 320 may also include values from the location-based environmental conditions dataset 312 such as the weather type at the time of the accident, a weather severity at the time of the accident, and/or other environmental metrics. In some embodiments, the dataset may also be used by the model subsystem 116 to determine parameters for a learning system such as a neural network, which may be included in the prediction model 320.

Once configured, an instance of the prediction model 320 may be executed as a configured prediction model 330. In some embodiments, an instance of the configured prediction model 330 may be stored on a server and may be used by a prediction subsystem 114 in communication with a user via an application protocol interface executing on the server. Alternatively, or in addition, the instance of the configured prediction model 330 may be executed by a user's local machine. The instance of the configured prediction model 330 may obtain data that indicates a first vehicle and an input location 336. For example, the instance of the configured prediction model 330 may obtain input vehicle data 334 including a name, identification number, or other indicator of a first vehicle having a year "2020," a maker identifiable as "FictionalManufacturer," and a model identifiable as "FictionalModel." In addition, the input vehicle data 334 may include values corresponding to a first input location "30.2672° North, 97.7431° West" and second input location "38.8816° North, 77.0910° West" in the region 332 represented by the input location 336. The instance of the configured prediction model 330 may be used to generate a set of positions, lines and/or regions from the first input location to the second input location represented by the outlined area 338.

Based on the outlined area 338 or locations in the outlined area 338, the configured prediction model 330 may determine a set of damage-reduction-related values 340 for the input vehicle. For example, the prediction model may analyze locations in the outlined area 338 to determine a distribution of weather patterns to determine which weather patterns are most prevalent for an area. Based on the distribution of weather patterns, the prediction model may then use a clustering model to determine accident likelihoods for each of the weather patterns and combine the results as a weighted sum to determine an expected accident likelihood for a vehicle driving in the region over an expected vehicle lifespan.

Example Flowcharts

Figure 4:
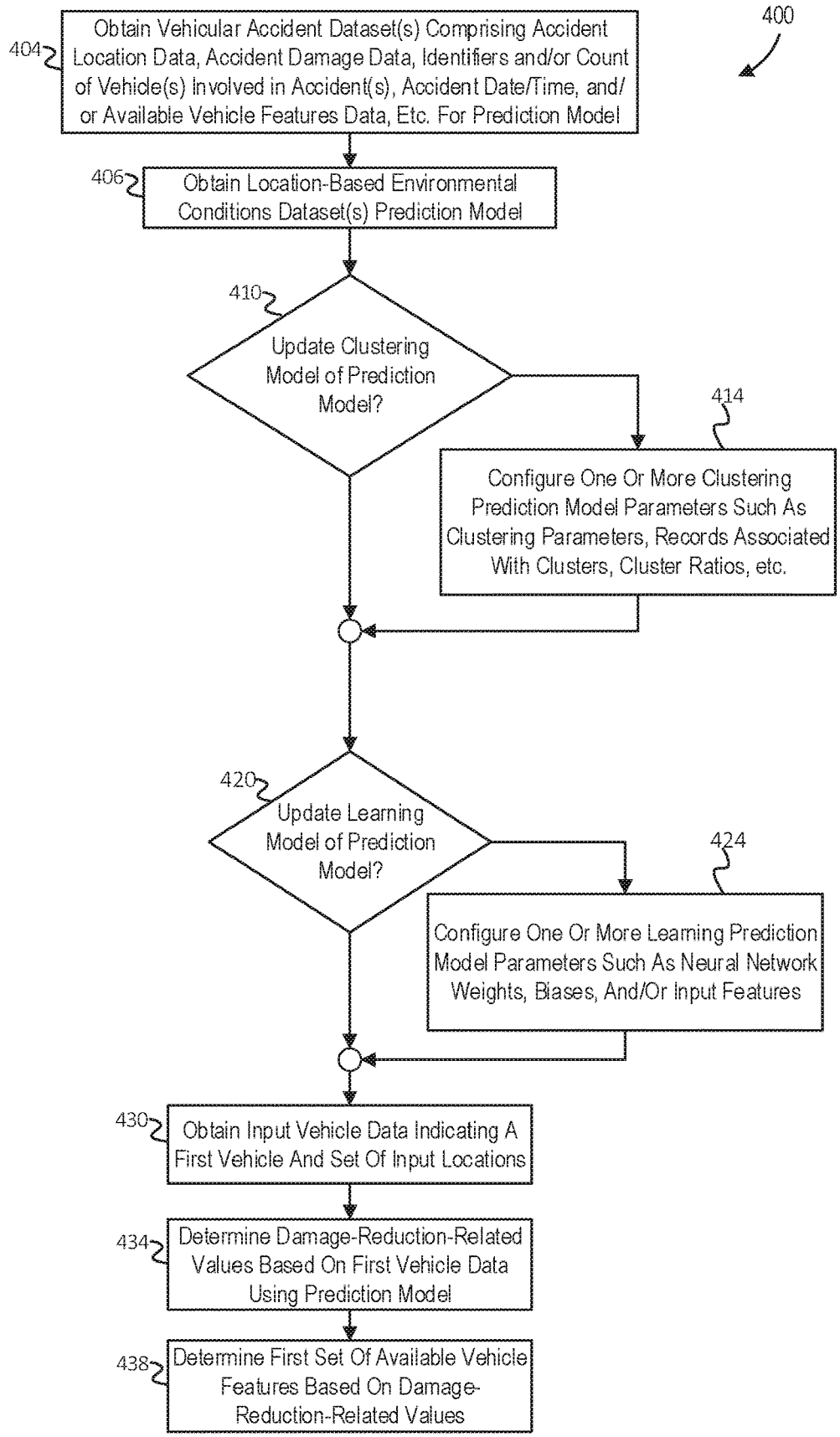
FIG. 4 shows a flowchart of a method for facilitating the configuration and utilization of a prediction model, in accordance with one or more embodiments.

FIG. 4 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 for determining damage-reduction-related values, in accordance with one or more embodiments. In an operation 404, one or more vehicular accident datasets including accident location data, accident damage data, identifiers of and/or the number of vehicles involved the accident, accident date/time, and/or available vehicle features data may be obtained and provided to a prediction model. In some embodiments, data from different databases may be obtained and/or used to generate results. Either or both the database data and the results may be included as part of the dataset provided to the prediction model. For example, each record of a vehicular accident database may include an accident identifier, accident location data in the form of global coordinates associated with the position of accident occurrence, accident damage data in the form of a monetary value and/or an injury count, vehicle features data in the form of a hash map that includes indicators of the presence of one or more vehicle features, accident date data in the form of a date value, and one or more VIN values indicating vehicles involved in the accident.

In some embodiments, a computer system may access the vehicular accident database and determine a set of vehicle features installed on one or more of the vehicles involved in the accident based on the vehicle identifiers. For example, a computer system may use the vehicle identifier of a vehicle to extract data from a vehicle database to determine which vehicle features are included on the identified vehicle by default. Alternatively, or in addition, the computer system may also access and/or communicate with one or more vehicle manufacturing databases for each of the identified vehicles to determine a dataset of available vehicle features to provide a list of vehicle features that may be installed on one or more identified vehicles in the vehicular accident dataset(s). Furthermore, some embodiments may determine vehicle features installed/present in a vehicle associated with an accident based on images of the accident identified by the record. Various image recognition systems may be used to determine vehicle features based on visual recordings of an accident and/or an accident aftermath. For example, a computer system may perform image recognition on a trained neural network for the purposes of detecting the presence of tinted windows, tires, rear-view cameras, or other features installed on a vehicle.

In an operation 406, one or more location-based environmental conditions datasets may be obtained and provided to the prediction model. In some embodiments, the location-based environmental conditions datasets may be obtained from one or more databases. A location-based environmental conditions dataset may include a history of weather conditions and/or physical conditions (e.g., icy roads, forest fire ash storm, etc.) for locations in a region over a period of time. In some embodiments, the location-based environmental conditions dataset may be obtained from an external database. For example, the location-based environmental conditions dataset may be obtained from a government or academic database via a database API. In some embodiments, the location-based environmental conditions dataset may be obtained from a database that is also a source of values for the vehicular accident dataset(s). For example, the location-based environmental conditions dataset may include one or more values from a database that includes an identifier for an accident, an accident location, an accident time, and weather type at the accident location during the occurrence of the accident.

In an operation 410, a determination is made of whether a clustering model of the prediction model is to be updated. In some embodiments, the prediction model includes a clustering model. Some embodiments may determine that the clustering model is to be updated if the clustering model has not yet performed any clustering operations on the data from the vehicular accident dataset and/or the location-based environmental conditions dataset. Alternatively, or in addition, some embodiments may determine that the clustering model is to be updated if either or both the vehicular accident dataset(s) and/or the location-based environmental conditions dataset(s) has been updated. If the clustering model is to be updated, operations of the method 400 may proceed to operation 414. Otherwise, operations of the method 400 may proceed to an operation 420. In some embodiments, operation 410 may be performed by a subsystem that is the same or similar to the model subsystem 116.

In the operation 414, responsive to a determination that the clustering model is to be updated, one or more clustering prediction model parameters may be configured. In some embodiments, prediction model parameters may include a set of clustering prediction model parameters, where the clustering prediction model parameters may include clustering parameters, one or more records associated with particular clusters, a ratio of total clusters, one or more labels associated with the clusters, and the like. For example, the clustering prediction model parameters may include a number of records associated with a first cluster and a number of records associated with a second cluster, where the prediction model includes operations to label the first cluster and the second cluster based on sets of vehicle features, geolocations, and/or environmental conditions. Configuring the clustering model may include performing one or more clustering operations to generate the clustering model. Various clustering algorithms may be used to determine clusters, such as K-means clustering, mean-shift clustering, density-based spatial clustering with noise (DBSCAN), expectations-maximization clustering with gaussian mixture models, and agglomerative hierarchical clustering.

In some embodiments, a plurality of clusters may be determined after the clustering operations described above, where each of the plurality of clusters may be associated with a different set of vehicle features and/or a different environmental condition. For example, each record associated with a first cluster may include an indicator indicating that a rearview camera is present, and each record associated with a second cluster may include an indicator indicating that a rearview camera is not present. As another example, each record associated with a first cluster may include a weather type category of "raining" and each record associated with a second cluster may include a weather type category of "sunny." The number of records associated with the first cluster may be used to determine a first fatality value associated with "raining" weather and the records associated with the second cluster may be used to determine a second fatality value associated with "sunny" weather, where the prediction model parameters includes the first and second fatality values.

In some embodiments, clustering operations may be performed iteratively with different sets of feature types. For example, a dataset including vehicular accident data and location-based environmental conditions data may be clustered into a set of supergroups based on a first set of data features from the dataset. A second clustering operation may be performed on one or more of the super-groups based on a second set of data features from the vehicular accident data. In some embodiments, the clustering may be performed iteratively to balance computational performance with data bandwidth with respect to communication between a server system and a client device, where a first clustering operation is performed by the server system before the user provides input vehicle data and the second clustering operation is performed after the user provides the input vehicle data. For example, a user may provide input vehicle data identifying an input vehicle and a set of locations, and, in response, some embodiments may perform a second clustering operation that is restricted to data from clusters associated with at least one of the input vehicle type or the set of locations as determined by a first clustering operation. In some embodiments, operation 414 may be performed by a system that is the same as or similar to the clustering subsystem 112.

In the operation 420, a determination is made of whether a learning model of the prediction model is to be updated. In some embodiments, the prediction model includes a learning model such as a neural network, support vector machines, decision trees, similarity learning, and the like. Some embodiments may determine that the learning model is to be updated if no training operations have been performed on the supervised learning model using the vehicular accident dataset and/or the location-based environmental conditions dataset. Alternatively, some embodiments may determine that the learning model is to be updated if either or both the vehicular accident dataset and/or the location-based environmental conditions dataset have been updated. If the learning model of the prediction model is to be updated, operations of the method 400 may proceed to operation 424. Otherwise, operations of the method 400 may proceed to an operation 430.

In the operation 424, responsive to determining that the learning model of the prediction model is to be updated, one or more learning prediction model parameters may be configured. In some embodiments, the learning prediction model parameters may be configured by training a learning system. For example, the learning model may include a neural network, where the neural network may be trained on features determined based on the vehicular accident dataset and/or the location-based environmental conditions dataset. In some embodiments, input values such as vehicle type, environmental conditions, features present on vehicles, and the like may be used as training input values and during the training of the neural network, where the expected outputs may include values such as an accident cost, a medical cost, a number of accidental injuries or fatalities, and the like. In some embodiments, the neural network may be trained without using specific vehicle data or vehicle type as inputs. Furthermore, some embodiments may be trained to predict vehicle model or vehicle type data as output, such as vehicle types including a set of vehicle features. In some embodiments, the training data for the neural network may be obtained from one or more clusters resulting from a clustering operation, such as the clustering operations described above in the operation 414. Alternatively, the training data for the neural network may be determined independently of any clustering operation result.

In some embodiments, training a neural network may include additional machine learning training operations such as transfer learning operations and/or attention mechanism operations. Transfer learning operations may include providing the neural network with one or more pre-trained layers from a pre-trained neural network. Additionally, training a neural network may include using an attention mechanism in the neural network to track changes over a sequence with respect to one or more feature types. For example, training the neural network may include applying an attention function to determine an attention value for each of a set of vehicle features, where the attention value is correlated with the amount of change in accident damages resulting from the presence or absence of the vehicle feature. The neural network may then be trained on the vehicle features having attention values that exceed an attention threshold. In some embodiments, operation 424 may be performed by a subsystem that is the same as or similar to the model subsystem 116.

In the operation 430, input vehicle data indicating a first vehicle and/or a set of input locations may be obtained. The input vehicle data may be obtained from any number of sources such as a webpage, an application being executed on an online web application, an application being executed on a mobile device, and the like. For example, input vehicle data and location data may be obtained from one or more digital forms requesting financing for a selected vehicle on a client device. Alternatively, or in addition, input vehicle data and/or location data may be obtained from a previous history of the user. For example, location data may be obtained from one or more stored addresses in the user's previous history. As another example, location data may be obtained from a credit card purchasing history available to the prediction model. For example, a user's purchasing history may be analyzed and the most visited locations and/or physical structures may be included in the set of input locations. Furthermore, location data may include anticipated future locations, such as determined from a response to a query requesting future vacation plans or long-term address changes. In some embodiments, operation 430 may be performed by a subsystem that is the same as or similar to the prediction subsystem 114.

While the above input vehicle data may include data corresponding to a specific input vehicle model, some embodiments may instead include only information about an input vehicle type. For example, some embodiments may obtain the input vehicle type "SUV" based on a message sent from a client device, where a user had selected of "SUV" on a web application being used on the client device. Alternatively, or in addition, some embodiments may use the input locations to determine damage-reduction-related values without using a specific input vehicle model or an input vehicle type.

In the operation 434, damage-reduction-related values are determined based on the first vehicle data using the configured prediction model. In some embodiments, the prediction model may use the clustering model to determine a ratio of accidents between vehicles having a particular feature and vehicles not having the particular feature based on the number of values associated with the feature in each cluster, where the damage-reduction-related value may be the ratio itself or based on the ratio itself. For example, if the number of accidents involving a particular vehicle type having a first feature and not having the first feature for a first weather type is 1:9, the damage-reduction-related value may be the ratio 1/9 with respect to the first feature and first weather type based the number of records associated with each of a pair of clusters. While the above example is described as performing or using the clustering model based on vehicle type, some embodiments may obtain damage-reduction-related values without consideration to specific vehicle data related to the first vehicle data. For example, some embodiments may use the clustering model without filtering by vehicle type to compare individual features or sets of features to determine damage-reduction-related values.

In some embodiments, the prediction model may use a supervised learning model to determine damage-reduction-related values. For example, the prediction model may use a trained neural network to predict one or more damage-reduction-related values based on an input vehicle type, a set of locations, and a set of vehicle features. In some embodiments, the trained neural network may be used after an unsupervised learning operation as described above. Alternatively, the trained neural network may be used directly to predict one or more damage-reduction-related values without performing clustering operations. Furthermore, some embodiments may use the neural network without using specific vehicle data (e.g. vehicle model, vehicle type, and the like) as inputs to determine damage-reduction-related values. In some embodiments, operation 434 may be performed by a subsystem that is the same as or similar to the prediction subsystem 114.

In an operation 438, a first set of available vehicle features is determined based on the damage-reduction-related values. In some embodiments, the first set of available vehicle features may be determined based on a selection of either a minimum or maximum of the damage-reduction-related values determined above. For example, if a set of damage-reduction-related values consisted of the values [0.3 casualties, 10.9 casualties, 0.04 casualties], the configured prediction model may determine that the set of vehicle features associated with least number of casualties, 0.04 casualties in this example, is the first set of available vehicle features to be displayed to a user.

The set of damage-reduction-related values may vary depending on the region in which a vehicle is designated to travel. For example, a set of damage-reduction-related values may include the attribute-value pairs [withCollisionWarn: 0.3, withoutCollisionWarn: 0.04] for a first set of locations and [withCollisionWarn: 0.05, withoutCollisionWarn: 0.06] for a second set of locations, where the values for the attributes "withCollisionWarn" and "withoutCollisionWarn" represents injuries or fatalities probabilities for the first vehicle type with and without collision warning features, respectively. As described above, difference in damage-reduction-related values may be a result of differences in the weather pattern distributions or weather severity between the first set of locations and the second set of locations. Thus, if a criterion to determine whether or not to install a vehicle feature is based on determining a lowest injury or fatality rate, the determination may vary based on the set of input locations.

In some embodiments, comparison values may be used to determine if a particular vehicle feature is to be installed onto a vehicle. In some embodiments, comparison values may be the same as damage-reduction-related values. Alternatively, or in addition, comparison values may be based on the damage-reduction-related values. For example, the presence or absence of a particular vehicle feature may result in accident probabilities of 4.9% and 15.0%, respectively, for a vehicle over an expected vehicle lifespan using the prediction model described above. In some embodiments, comparison scores may be generated as product of an expected accident cost and the accident probabilities. For example, if the expected accident cost score is −1000, the resulting comparison values may be −50 and −150 for the presence and absence of the particular vehicle feature, respectively. It should be noted that, while this example shows a greater score being correlated with a greater accident rate, some embodiments may select different metrics or scales, where a greater score is correlated with a reduced accident rate, cost, etc.

Additionally, an installation threshold may be used to compare a difference between the comparison values to determine whether a particular vehicle feature should be installed onto a vehicle. For example, the difference between a pair of comparison scores may be compared to an installation threshold representing a cost of installation, where a positive difference represents a decrease in the cost/fatality rate associated with the installation of a vehicle feature. Some embodiments may determine that a comparison score difference of satisfies the installation threshold if the difference exceeds the installation threshold. For example, if the difference is equal to 201 and the installation threshold, some embodiments may determine that the installation threshold is satisfied and that the corresponding vehicle feature associated with the difference of 201 should be installed onto a vehicle. In some embodiments, operation 438 may be performed by a subsystem that is the same or similar to the prediction subsystem 114.

In some embodiments, a determination that an installation threshold is satisfied may result in some embodiments sending a message to a client device indicating that the corresponding set of vehicle features should be installed. The client device may then display or otherwise indicate the installation of or suggestion to install a corresponding vehicle feature. For example, some embodiments may obtain an input vehicle type "hatchback" from a user selection and a set of locations, where the set of locations may be manually selected from a user or determined on a previous history of the user. Some embodiments may then determine a first set of vehicle features that should be installed and send a message based on the first set of vehicle features to the client device. The client device may then display a modal indicating that a vehicle or vehicle type selected by the user should include a set of additional vehicle features. Each vehicle feature may be displayed alongside text or numbers determined from their damage-reduction related values. For example, a modal window may display the vehicle feature title "snow tires" as a recommended feature based on a set of input locations and also display text or numbers based on damage-reduction-related values such as "10 fewer deaths across 100 purchases over 8 years" or "estimated $250 savings over 3 years" in proximity to the vehicle feature title.

Alternatively, or in addition to determining whether to install a feature on a known vehicle or vehicle type, a determination may be made to determine a subset of vehicles from a set of available vehicles based on the first set of available vehicle features. For example, a determination may be made that a first set of vehicle features should be installed. In response, some embodiments may search through a set of available vehicles to determine which of these vehicles include the first set of vehicle features. The vehicles that include the first set of vehicle features may then be collected as a recommended subset of vehicles. Some embodiments may then send a message based on this recommended subset of vehicles to a client device or display screen. For example, after determining that a recommended subset of vehicles including "2020 Maker2 Model5151" based on which vehicles from a set of available vehicles have a first set of vehicle features installed, some embodiments may send a message a device. In response to receiving the message, the device may then display a title, text description, and image associated with "2020 Maker2 Model5151" in a window on a display screen of the device. In some embodiments, the recommended subset of vehicles may be filtered by or otherwise based on an output of the trained neural network.

Some embodiments may send a message prompting the display of the recommended subset of vehicles in addition to displaying a first set of vehicle features for installation on an input vehicle. For example, some embodiments may transmit a message to a device to prompt the device to display a user-selected input vehicle "2021 Maker3 Model7" with a first set of vehicle features that should be installed on the vehicle based on a set of input locations. The message may also prompt the device to display a modal window or sidebar concurrently with the display of the input vehicle, where the modal window or sidebar may include a set of text or photos, where the text or photos are associated with a recommended subset of vehicles that include the first set of vehicle features.

In some embodiments, the various computers and subsystems illustrated in FIG. 1 may include one or more computing devices that are programmed to perform the functions described herein. The computing devices may include one or more electronic storages (e.g., prediction database(s) 132, which may include vehicular accident database(s) 134, weather data database(s) 136, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices; or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-114 may be eliminated, and some or all of its functionality may be provided by other ones of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method comprising: obtaining a first dataset comprising accident location data and present vehicle feature data, wherein the accident location data indicates one or more locations associated with one or more vehicular accidents, and the present vehicle feature data indicates one or more sets of vehicle features present on one or more vehicles involved in the one or more vehicular accidents; configuring a set of prediction model parameters of a prediction model based on the accident location data and the present vehicle feature data for prediction of damage-reduction-related values associated with a set of available vehicle features for a vehicle in a geospatial region; obtaining first vehicle data indicating a first vehicle, a set of vehicle features available to the first vehicle, and a first geospatial region; and using the prediction model to determine one or more damage-reduction-related values for the first vehicle based on the first vehicle data; and generating a first set of features for the first vehicle based on the one or more damage-reduction-related values.

2. The method of embodiment 2, wherein configuring the set of prediction model parameters comprises: performing clustering on the first dataset to generate a set of supergroups based on a first subset of data in the first dataset; performing clustering on the set of supergroups to generate a set of clusters comprising a first cluster based on a second subset of data in the first dataset, wherein the second subset of data comprises at least one value from the present vehicle feature data that is not in the first subset of data; and configure a first parameter of the set of prediction model parameters based on a number of records associated with the first cluster.

3. The method of any of embodiments 1-2, the method further comprising: performing image recognition on a set of images of an imaged vehicle identified in the first dataset to determine whether a feature is installed in the imaged vehicle; and providing an indication in the first dataset that the feature is present in the imaged vehicle.

4. The method of any of embodiments 1-3, the method further comprising: obtaining an expected vehicle lifespan correlated with the first vehicle, wherein determining the one or more damage-reduction-related values comprises using the prediction model to determine the one or more damage-reduction-related values for the first vehicle based on the first vehicle data and the expected vehicle lifespan.

5. The method of embodiment 4, wherein obtaining the expected vehicle lifespan comprises: determining a vehicle ownership time period based on past vehicle ownership history associated with a user profile; and determining the expected vehicle lifespan based on the vehicle ownership time period.

6. The method of any of embodiments 1-5, wherein the first dataset comprises values correlated with counts of injuries or fatalities corresponding to the one or more vehicular accidents, and wherein generating the first set of features is based on the counts of injuries or fatalities.

7. The method of any of embodiments 1-6, wherein at least one record in the first dataset further comprises a first weather severity value, and wherein the one or more damage-reduction-related values is determined based on the first weather severity value.

8. The method of any of embodiments 1-7, wherein the first geospatial region comprises a continuous geospatial sub-region between a first location and a second location.

9. The method of any of embodiments 1-8, further comprising: determining a set of most visited locations based a user history of visited locations; and determining the first geospatial region such that the first geospatial region comprises the set of most visited locations.

10. The method of any of embodiments 1-9, wherein configuring the set of prediction model parameters comprises performing clustering on the first dataset to generate clusters of associated records from the first dataset, and wherein the set of prediction model parameters comprise a number of records associated with the clusters of associated records from the first dataset.

11. The method of embodiment 10, wherein the clusters of associated records from the first dataset comprises a first cluster and a second cluster, and wherein first record of the first cluster comprises a first set of present vehicle features, and wherein a second record of the second cluster comprises a second set of present vehicle features, and wherein the second set of present vehicle features is different from the first set of present vehicle features.

12. The method of any of embodiments 10-11, wherein the first dataset comprises a set of weather types, and wherein each of the clusters of associated records from the first dataset is associated with one of the set of weather types.

13. The method of any of embodiments 1-12, wherein generating the first set of features comprises comparing a plurality of comparison values, and wherein a first comparison value of the plurality of comparison values is based on a product comprising at least one of the one or more damage-reduction-related values.

14. The method of any of embodiments 1-13, wherein the first dataset comprises a vehicular accident dataset, wherein the vehicular accident dataset comprises accident damage data and the accident location data, and wherein the present vehicle feature data comprises installed vehicle feature data, and wherein the accident damage data indicates damage resulting from the vehicular accidents, and wherein the installed vehicle feature data indicates sets of installed vehicle features present on vehicles involved in the vehicular accidents; obtain an available vehicle feature dataset comprising available vehicle feature data, wherein the available vehicle feature data indicate sets of available vehicle features available as options for the vehicles; and wherein configuring the set of prediction model parameters comprises providing the vehicular accident dataset and the available vehicle feature dataset to a neural network to train the neural network to predict the damage-reduction-related values associated with available vehicle features for a vehicle in a geospatial region, wherein the neural network assesses the predicted damage-reduction-related values against the vehicular accident dataset and the available vehicle feature data, and wherein the neural network updates layers of the neural network based on the neural network's assessment of the predicted damage-reduction-related values; and subsequent to the updating of the neural network, wherein the damage-reduction-related values is predicted by the neural network, and wherein the neural network predicted the one or more damage-reduction-related values based on the first vehicle data, and wherein the first geospatial region includes a first location.

15. The method of any of embodiments 1-14, further comprising transmitting installation instructions to a vehicle manufacturing system such that the vehicle manufacturing system is caused to install the first set of available vehicle features on the first vehicle.

16. The method of any of embodiments 14-15, further comprising obtaining a weather location dataset, wherein the weather location dataset comprises time data, location data, and a weather severity value; and provide the weather location dataset to the neural network to train the neural network to predict the damage-reduction-related values.

17. The method of any of embodiments 1-16, wherein the first dataset further comprises accident damage, wherein the accident damage data indicates damage resulting from the one or more vehicular accidents.

18. The method of any of embodiments 1-17, wherein the prediction model is a neural network, and wherein configuring the set of prediction model parameters comprises providing the first dataset to the neural network to train the neural network to predict damage-reduction-related values associated with one or more available vehicle features for a vehicle in the geospatial region.

19. The method of any of embodiments 1-18, the method further comprising determining whether the first set of vehicle features is scheduled for installation on the first vehicle; and in response to a determination that the first set of vehicle features is scheduled for installation on the first vehicle, sending the first set of vehicle features to an application being executed by a server via an application interface protocol of the application.

20. The method of any of embodiments 1-19, wherein configuring the set of prediction model parameters comprises: performing clustering on the first dataset to generate a first cluster and a second cluster based on the first dataset, and wherein a first record associated with the first cluster comprises a first feature, and wherein a second record associated with the second cluster does not comprise the first feature; configuring a first parameter of the set of prediction model parameters based on a first number of records associated with the first cluster; and configuring a second parameter of the set of prediction model parameters based on a second number of records associated with the second cluster.

21. One or more tangible, non-transitory, machine-readable media storing instructions that, when executed by one or more processors, effectuation operations comprising those of any of embodiments 1-20.

22. A system comprising: one or more processors; and memory storing computer program instructions that, when executed by the one or more processors, cause the one or more processors to effectuate operations comprising those of any of embodiments 1-20.

What is claimed is:

1. A method comprising:
generating a first data cluster based on accident location data indicating locations associated with vehicular accidents;
generating a second data cluster based on vehicle feature data indicating sets of vehicle features present on vehicles involved in the vehicular accidents;
configuring a set of model parameters of a model based on the first data cluster and the second data cluster;
obtaining a set of locations associated with a user;
subsequent to the configuring of the set of model parameters, determining a set of values with the model based on the set of locations;
generating a set of vehicle features associated with a set of vehicles of a plurality of vehicles based on the set of values; and
sending a message to a client device that causes the client device to indicate at least one feature of the set of vehicle features.

2. The method of claim 1, further comprising obtaining a vehicle type, and wherein the set of vehicles are categorized as being of the vehicle type.

3. The method of claim 1, wherein the set of vehicle features comprises a tire-related feature, a mirror-related feature, a windshield-related feature, a braking system-related feature, a forward collision indicator-related feature, a blind spot alert-related feature, or vehicle lighting-related feature.

4. The method of claim 1, further comprising:
determining whether a first value of the set of values satisfies an installation threshold; and
determining the set of vehicle features comprises selecting the set of vehicle features based on a determination that the first value satisfies the installation threshold.

5. The method of claim 1, wherein:
the set of values comprises a plurality of values; and
determining the set of vehicle features comprises determining a minimum or maximum value of the plurality of values.

6. One or more non-transitory, machine-readable media storing instructions that, when executed by one or more processors, performs operations comprising:
generating a first data cluster based or accident location data indicating locations associated with vehicular accidents,
generating a second data cluster based on vehicle feature data in indicating sets of vehicle features present on vehicles involved in the vehicular accidents;
configuring a set of model parameters of a model based on the first data cluster, and the second data cluster;
obtaining a set of locations associated with a user;
subsequent to the configuring of the set of model parameters, determining a set of values with the model based on the set of locations;
determining a set of vehicle features based on the set of values; and
sending a message to a client device that causes the client device to display a user interface element indicating a selected set of vehicles, wherein each vehicle of the selected set of vehicles is indicated as including the set of vehicle features.

7. The one or more media of claim 6, the operations further comprising:
obtaining a set of ownership periods for previous vehicles associated with the user;
determining an expected duration for a first vehicle type based on the set of ownership periods, wherein the vehicles involved in the vehicular accidents comprises a vehicle of the first vehicle type; and
wherein determining the set of values comprises determining the set of values based on the expected duration.

8. The one or more media of claim 7, further comprising determining a measure central tendency based on a plurality of ownership periods, wherein the set of ownership periods comprises the plurality of ownership periods, and wherein the expected duration comprises the measure central tendency.

9. The one or more media of claim 6, wherein obtaining the set of locations comprises:
obtaining a history of the user, wherein the history indicates a set of purchases associated with at least one location; and
determining the set of locations based on the history.

10. The one or more media of claim 6, wherein obtaining the set of locations comprises determining a set of addresses stored in association with a user history.

11. The one or more media of claim 6, wherein obtaining the set of locations comprises obtaining the set of locations via a user interface being displayed on the client device.

12. The one or more media of claim 6, further comprising:
obtaining a first set of category values corresponding with the accident location data, wherein:
each respective category value of the first set of category values identifies an environmental condition and is associated with a respective accident location of the accident location data, and
configuring the set of model parameters comprises configuring the set of model parameters based on the first set of category values; and
determining a second set of category values based on the set of locations, wherein determining the set of values comprises using the model to determine the set of values based on the second set of category values.

13. The one or more media of claim 6, further comprising:
determining whether the accident location data has been updated; and
in response to a determination that the accident location data has been updated, updating the model based on the accident location data.

14. The one or more media of claim 6, wherein determining the set of values comprises:
determining a third data cluster based on the first data cluster and the second data cluster; and
determining at least one value of the set of values based on the third data cluster.

15. The one or more media of claim 6, wherein the set of locations comprises:
- displaying a query to a user interface of the client device; and
- determining a location of the set of locations based on a response from the client device indicating a future address.

16. The one or more media of claim 6, wherein, for each respective vehicle of the set of vehicles, at least one feature of the set of vehicle features is indicated as being installed or installable on the respective vehicle.

17. A system for vehicle feature selection, the system comprising:
- one or more memory devices storing instructions; and
- one or more processors configured to execute the instructions, the instructions comprising:
  - generating a first data cluster of a prediction model based on accident location data, the accident location data indicating locations associated with vehicular accidents;
  - generating a second data cluster of the prediction model based on installed vehicle feature data, the installed vehicle feature data indicating sets of installed vehicle features present on vehicles involved in the vehicular accidents;
  - configuring a set of prediction model parameters of the prediction model by updating the set of prediction model parameters based on the first data cluster and the second data cluster;
  - obtaining, via a client device, user data comprising a set of locations indicated as visited by a user;
  - subsequent to the configuring of the set of prediction model parameters of the prediction model, using the prediction model to determine a set of damage-reduction-related values based on the set of locations;
  - determining a set of vehicle features based on the set of damage-reduction-related values;
  - selecting one or more of vehicles of a plurality of vehicles based on the set of vehicle features, wherein each vehicle of the one or more of vehicles is indicated as including the set of vehicle features; and
  - sending a message to the client device that causes the client device to display, concurrently with the one or more of vehicles, a user interface element indicating the set of vehicle features.

18. The system of claim 17, the instructions further comprising obtaining an identifier from the client device, wherein:
- the identifier indicates a vehicle category associated with the plurality of vehicles;
- using the prediction model to determine the set of damage-reduction-related values comprises determining, for each respective vehicle of the plurality of vehicles, a respective damage-reduction-related value of a plurality of damage-reduction-related values of the plurality of vehicles; and
- determining the set of vehicle features comprises determining a minimum or maximum of the set of damage-reduction-related values.

19. The system of claim 17, the instructions further comprising:
- obtaining a first set of weather values corresponding with the accident location data, wherein:
  - each respective weather value of the first set of weather values identifies a weather type and is associated with a respective accident location of the accident location data, and
  - configuring the set of prediction model parameters comprises configuring the set of prediction model parameters based on the first set of weather values; and
- determining a second set of weather values based on the set of locations, wherein using the prediction model comprises using the prediction model to determine the set of damage-reduction-related values based on the second set of weather values.

20. The system of claim 19, the instructions further comprising obtaining a future location indicated by the user, wherein determining the second set of weather values comprises determining the second set of weather values based on the future location.

* * * * *